C. C. CARPENTER.
ELECTRODE FOR STORAGE BATTERIES.
APPLICATION FILED FEB. 3, 1909.

1,190,982. Patented July 11, 1916.

Witnesses:

Inventor:
Campbell C. Carpenter

UNITED STATES PATENT OFFICE.

CAMPBELL C. CARPENTER, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ELECTRODE FOR STORAGE BATTERIES.

1,190,982.  Specification of Letters Patent.  Patented July 11, 1916.

Application filed February 3, 1909. Serial No. 475,903.

*To all whom it may concern:*

Be it known that I, CAMPBELL C. CARPENTER, a citizen of the United States, residing at Buffalo, in the county of Erie and State of New York, have invented a certain new and useful Improvement in Electrodes for Storage Batteries, of which the following is a specification.

My invention relates to plates or electrodes for storage batteries especially those formed electrochemically from plates of lead or other suitable material. Such batteries employ an electrolyte consisting of an acid solution, and it is well known by those familiar with this type of battery that the acid tends to eat away the body or core of the plate, which weakens it, and that the growth which results from the electrochemical action tends to cause the plate to buckle.

As a result of my invention a battery plate is produced in which the electro-chemical action takes place entirely or almost entirely upon the fins or ribs, without affecting the core to any appreciable extent. The core also is stiffer than in the plates heretofore employed and its conductivity is substantially as great as heretofore.

Figure 1:
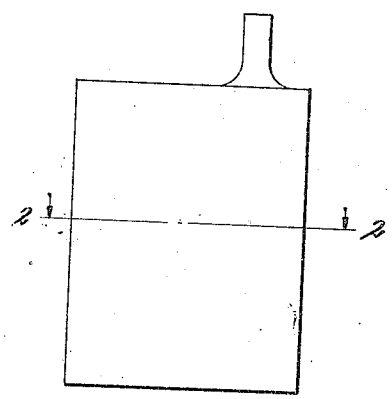
Figure 2:
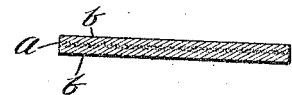
Figure 3:
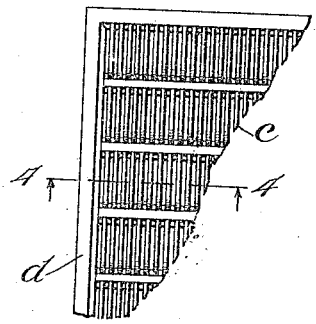
Figure 4:
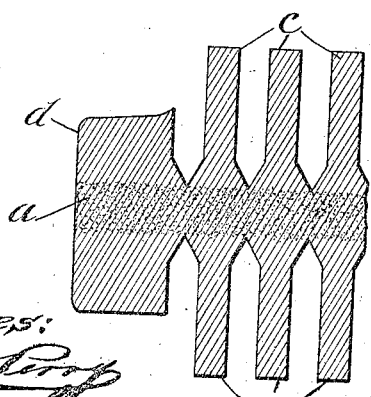

A plate embodying my invention is illustrated in the accompanying drawings, in which:

Figure 1 is a face view of a blank from which the plate may be produced. Fig. 2 is a section taken on the line 2—2 Fig. 1. Fig. 3 is an enlarged fragmentary view of the face of a plate of suitable form. Fig. 4 is a section still more enlarged, taken on the line 4—4 Fig. 3.

The essential feature of this invention is that the plate comprises a core $a$ formed integral with the other parts of the plate and consisting of a material stiffer than the remainder of the plate. For example in a suitable plate embodying this invention the core $a$ consists of a mixture of antimony and lead while the rest of the plate consists of substantially pure lead or other suitable material.

The invention will be readily understood by describing the preferred process by which the plate is manufactured.

The first step is to form a flat sheet, see Figs. 1 and 2, consisting of two layers of commercially pure sheet lead $b$ separated by, and fused or otherwise integrally united to an inner sheet $a$ consisting of lead mixed with antimony. The proportion is preferably about five percentum by weight of antimony to ninety five percentum of lead. Antimonious lead of this kind is found to have the following characteristics: First, it is practically proof against the electro-chemical action of the battery, it is much stiffer than sheet lead from which antimony is absent; and third, its conductivity is practically as great as pure lead. Fins or ribs $c$ and a border $d$ are then formed in the outer lead plates, as shown in Figs. 3 and 4, the preferred method of forming them being described in the application of Frank Engel filed November 14, 1907, Serial No. 402,164. In that application are described both a machine and the method by which it operates to form the fins or ribs, but it is sufficient here to say that when formed they present an appearance in elevation and cross section shown in Figs. 3 and 4, respectively, of the accompanying drawings. In Fig. 3 the size is greatly exaggerated for in actual practice these ribs occur, for example twenty-four to the inch.

It will be noted by reference to Fig. 4 that in the preferred form the ribs slope toward each other at the bottom, thus forming V shaped grooves. This form is preferable because the ribs are strengthened at the point of juncture, and as it forms an additional protection and covering of metal for the core where it would otherwise be exposed. This is not essential, however, for with my antimonious core this portion of the plate is hardly in need of protection.

A plate of this construction has great stiffness, both transversely and longitudinally, partly because of its configuration but chiefly on account of the rigidity of its antimonious core. The plate is long lived on account of the non-susceptibility of its core to the action of the electrolyte and electric current, and its conductivity is substantially equal to a similar battery element whose core lacks the antimonious ingredient.

I claim as my invention.

1. A grid for Planté battery plates comprising a central core of an alloy of lead and a stiffening metal, and parallel ribs formed on the opposite faces of said core, said ribs composed of pure lead integrally united to the opposite faces of said core, the bases of said ribs being thickened to reinforce the ribs at their juncture with said core.

2. A Planté plate, comprising a main body portion having oppositely extending ribs, said ribs being reinforced at the point of junction with said body portion, the body consisting of metal integral with said ribs and having an intermediate antimonious stratum for stiffening purposes.

3. The method of forming a Planté battery plate which includes integrally uniting sheets of material, capable of being electrochemically formed, to an intermediate sheet of material substantially inert to electrochemical action and forming corrugations or ribs on the opposite faces of the composite structure to increase the superficial area of the plate and to provide pockets for retaining active material.

CAMPBELL C. CARPENTER.

Witnesses:
ELIZABETH M. NAUTH,
ALLAN T. REIF.